US011956874B2

(12) United States Patent
Hosler et al.

(10) Patent No.: US 11,956,874 B2
(45) Date of Patent: Apr. 9, 2024

(54) WEARABLE DEVICE WITH INTEGRATED FLASHLIGHT

(71) Applicant: Garmin International, Inc., Olathe, KS (US)

(72) Inventors: Jonathan R. Hosler, Overland Park, KS (US); Aaron J. Lindh, Olathe, KS (US); Steven J. Christy, Overland Park, KS (US); Vincent G. Marco, Grandview, MO (US); Thomas I. Loschen, Olathe, KS (US); Brent E. Barberis, Overland Park, KS (US); Hans K. Fritze, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/329,724

(22) Filed: Jun. 6, 2023

(65) Prior Publication Data

US 2023/0319964 A1 Oct. 5, 2023

Related U.S. Application Data

(63) Continuation of application No. 17/659,747, filed on Apr. 19, 2022, now Pat. No. 11,711,877.

(Continued)

(51) Int. Cl.
*H05B 47/115* (2020.01)
*G04G 21/02* (2010.01)

(52) U.S. Cl.
CPC ......... *H05B 47/115* (2020.01); *G04G 21/025* (2013.01)

(58) Field of Classification Search
CPC ....... G06F 3/017; G06F 1/163; H05B 47/115; G04G 21/025; G04G 9/0064; G04G 21/02
See application file for complete search history.

(56) References Cited

U.S. PATENT DOCUMENTS 7,787,857 B2 8/2010 Peterman
8,060,337 B2 11/2011 Kulach et al.
(Continued)

FOREIGN PATENT DOCUMENTS

CN 109283839 A * 1/2019 ............. G04C 10/02
CN 111200728 A 5/2020
JP 2001351416 A 12/2001

OTHER PUBLICATIONS

International Search Report and Written Opinion from PCT/US/2022/071822, dated Aug. 9, 2022.
(Continued)

*Primary Examiner* — Abdullah A Riyami
*Assistant Examiner* — Syed M Kaiser
(74) *Attorney, Agent, or Firm* — Samuel M. Korte; Max M. Ali

(57) ABSTRACT

A wrist-wearable electronic device comprising first and second light emitting elements, a sensor, and a processor. The processor is configured to transmit a first command to the first light emitting element in response to the wrist-wearable device reaching a forward position relative to a user based on data received from the sensor and transmit a second command to the second light emitting element in response to the wrist-wearable device reaching a rearward position relative to the user based on the data from the sensor.

21 Claims, 8 Drawing Sheets

Related U.S. Application Data

(60) Provisional application No. 63/177,204, filed on Apr. 20, 2021.

(56) References Cited

U.S. PATENT DOCUMENTS

| | | | |
|---|---|---|---|
| 9,921,648 B2 | 3/2018 | Kim et al. | |
| D921,625 S | 6/2021 | Lee et al. | |
| 2007/0201221 A1 | 8/2007 | Cherdak et al. | |
| 2010/0163027 A1 | 7/2010 | Hyde et al. | |
| 2012/0140451 A1 | 6/2012 | Araujo et al. | |
| 2014/0244505 A1* | 8/2014 | Kim | G04G 21/00 345/156 |
| 2016/0097787 A1 | 4/2016 | Kim et al. | |
| 2016/0262701 A1* | 9/2016 | Abreu | A61B 5/4064 |
| 2016/0287087 A1* | 10/2016 | Abreu | A61F 7/007 |
| 2017/0231560 A1* | 8/2017 | Hyde | A61B 5/0002 340/870.07 |
| 2017/0364156 A1 | 12/2017 | Kim et al. | |
| 2018/0137266 A1 | 5/2018 | Kim et al. | |
| 2018/0166157 A1* | 6/2018 | Firminger | G16H 20/70 |
| 2018/0356534 A1 | 12/2018 | Sugiyama et al. | |
| 2019/0033787 A1 | 1/2019 | Swanagin et al. | |
| 2019/0087012 A1 | 3/2019 | Miller et al. | |
| 2020/0073335 A1* | 3/2020 | Matthey | G04G 17/08 |
| 2020/0323489 A1* | 10/2020 | Kim | A61B 5/681 |
| 2020/0367816 A1* | 11/2020 | Panneer Selvam | A61B 5/7475 |
| 2022/0338325 A1 | 10/2022 | Hosler et al. | |

OTHER PUBLICATIONS

Printout from https://www.amazon.com/Maxbei-Waterproof-Tactical-Rechargeable-Flashlight/dp/B07F8W7YFP/ published prior to Apr. 19, 2022.

Printout from https://www.amazon.com/Rechargeable-Waterproof-Watch-Flashlight-Tactical-Flashlights/dp/B01IYCZCNU published prior to Apr. 19, 2022.

* cited by examiner

WEARABLE DEVICE WITH INTEGRATED FLASHLIGHT

RELATED APPLICATION

The present application is a continuation of, and claims the priority benefit to, U.S. patent application Ser. No. 17/659,747, filed, Apr. 19, 2022, and entitled "WRIST-WEARABLE ELECTRONIC DEVICE INCLUDING A LIGHT EMITTING ELEMENT," which in turns claims priority benefit, with regard to all common subject matter, of earlier-filed U.S. Provisional Application entitled "WEARABLE DEVICE WITH INTEGRATED FLASHLIGHT", Ser. No. 63/177,204, filed Apr. 20, 2021. The above-identified applications are incorporated by reference, in their entirety, into the current patent application.

BACKGROUND

Wearable electronic devices, such as global navigation satellite system (GNSS)-enabled smartwatches like the Garmin Forerunner® or Fēnix®, are often used by athletes to measure speed, distance, and other metrics during exercise. Athletes may exercise in conditions of varying visibility, such as at dusk, at night, at dawn, in fog, in haze, in rain, in sleet, or in snow. Some athletes carry a flashlight when exercising to see and/or be seen.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

Figure 1A:
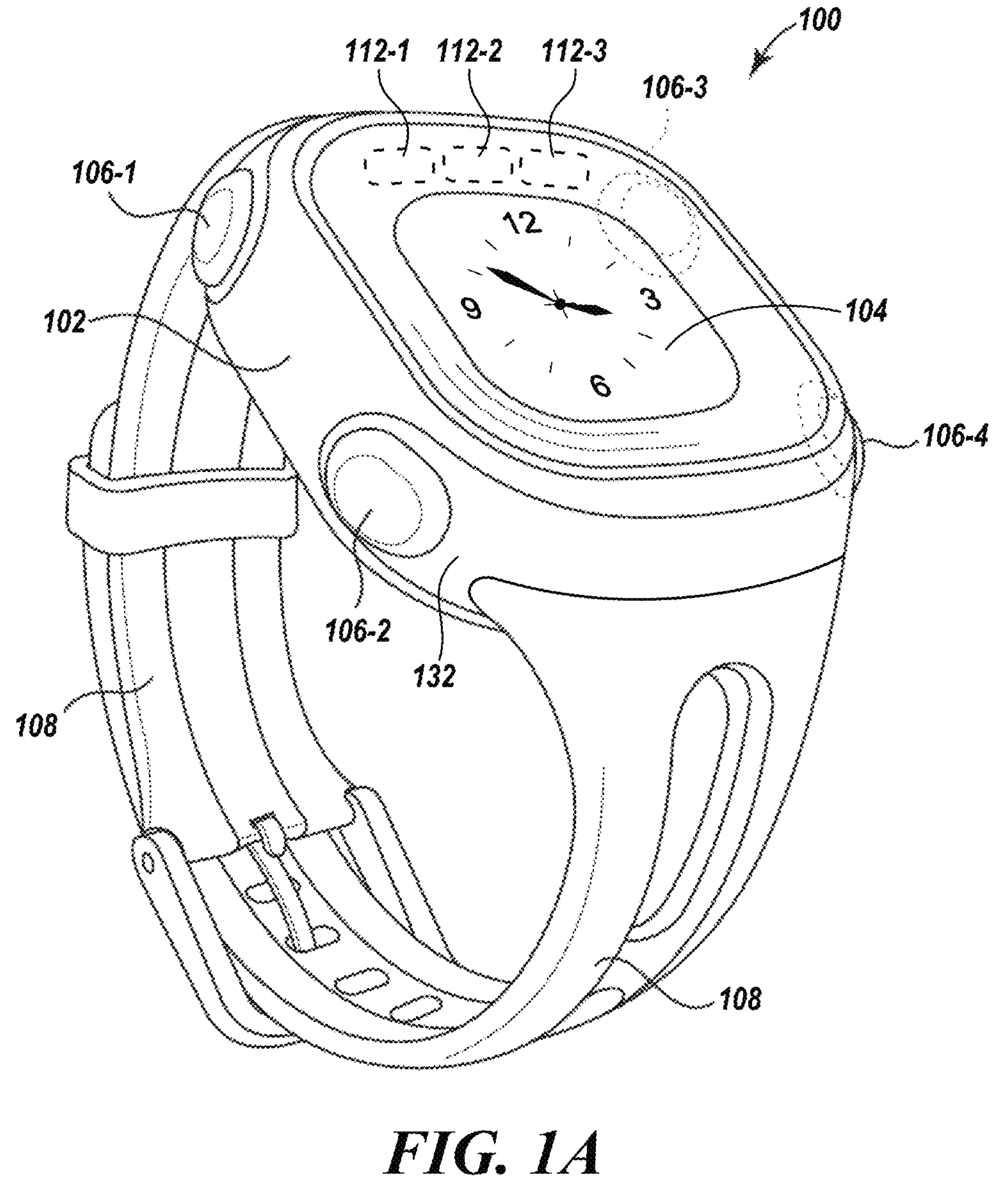
FIG. 1A is a perspective view of a wrist-wearable electronic device including a number of light emitting elements.

The present disclosure includes a wrist-wearable electronic device including a light emitting element to assist a user to see and/or be seen. The wrist-wearable electronic device can include first and second light emitting elements, a sensor, and a processor. The processor may be configured to transmit a first command to the first light emitting element in response to the wrist-wearable device reaching a forward position relative to a user based on data received from the sensor and transmit a second command to the second light emitting element in response to the wrist-wearable device reaching a rearward position relative to the user based on the data from the sensor. In some examples, the first light emitting element and the second light emitting element are positioned between 10:00 and 2:00 on a sidewall of a housing for the device. The first light emitting element can generate a first color light for a first period of time in response to receipt of a first command from the processor and the second light emitting element can generate a second color light for a second period of time in response to receipt of a second command from the processor. Changing characteristics of the light based on user input, movement of the user, or the location of the user can increase the probability of the light making the presence of the user better known in low visibility conditions.

The wrist-wearable electronic device can be any wearable electronic device such as a watch, band, strap, bracelet, etc., that includes any number of light emitting elements, a processor, and/or sensors to adjust the characteristics of the light generated by the number of light emitting elements. In some configurations, the wrist-wearable electronic device controls and/or synchronizes the number of light emitting elements based on the user's movement or position.

In various embodiments, illustrated below, the number of light emitting elements may be positioned on, behind, and/or within a sidewall of the wrist-wearable electronic device's housing. For example, the number of light emitting elements may be integrated within the wrist-wearable electronic device's sidewall at approximately the 12:00 position. The number of light emitting elements can be used as a flashlight to illuminate areas of low visibility. The number of light emitting elements can include a light emitting diode (LED), an organic light emitting diode (OLED), and/or other electronic components capable of generating light. In one example configuration, the wrist-wearable electronic device can include two white LEDs and one red LED positioned between the white LEDs. Although some embodiments described herein include light emitting elements at approximately the 12:00 position, the invention is not so limited and the number of light emitting elements may be positioned at any location on the housing, the strap, the display, and/or the bezel.

Integrating the number of light emitting elements at approximately the 12:00 position allows the light emitting element to provide ambidextrous functionality and be equally useful when the wrist-wearable electronic device is worn on the right or left wrist of a user. Additionally, positioning the number of light emitting elements at approximately the 12:00 position enables the light emitting element to illuminate the ground around and in front of the user as the user walks and/or runs while limiting the amount of light that may shine into the user's eyes or the eyes of those nearby.

The wrist-wearable electronic device may provide quick access functionality to allow the user to quickly and easily turn on the number of light emitting elements. In one configuration, control buttons may be provided to turn the number of light emitting elements on, such as through a double tap. Additionally or alternatively, the housing may be touch sensitive to allow the number of light emitting elements to be turned on through gestures performed on the housing. Similarly, the display of the wrist-wearable electronic device may present various interfaces, including interactive widgets, to allow the user to set the color, intensity, and type of light generated by the number of light emitting elements. The widgets may allow the user to increase or decrease the intensity and color of the number of light emitting elements based on user inputs to the wrist-wearable electronic device. In some examples, the light emitting element may be configured for strobing, save our ship (SOS), and/or other periodic functionality.

In examples where the wrist-wearable electronic device is configured to generate movement metrics for the user, such as examples where the wrist-wearable electronic device is a GNSS-enabled device and/or an accelerometer-based device capable of sensing user movement, the wrist-wearable electronic device may control operation of the light emitting element to ensure that the user can easily be seen while exercising.

In some examples, the wrist-wearable electronic device's integrated accelerometer(s), attitude sensor(s), magnetometer(s), and/or gyroscope(s) are utilized to determine the arm and/or stride cadence of the user to control when and how the number of light emitting elements are illuminated. For example, changes in acceleration measured by an accelerometer of the wrist-wearable electronic device can be used to determine when the user's foot strikes the ground, when the user's arm reaches its most forward position, when the user's arm reaches its most rearward position, and/or when the user's arm is at the lowest part of its swing arc. Changes in light color, intensity, frequency, etc., may be triggered by any combination of these measurements to achieve the desired lighting effect.

Additionally or alternatively, GNSS position information, such as the user's speed and/or position may be utilized to determine when and/or how to illuminate the number of light emitting elements. Thus, for instance, the number of light emitting elements may illuminate more brightly, with different colors, and/or at an increased frequency, as the user's speed increases. In examples where the wrist-wearable electronic device includes a cartographic database, the user's position may additionally or alternatively be used to control operation of the number of light emitting elements. For example, the wrist-wearable electronic device may illuminate more brightly, with different colors, and/or at an increased frequency as the user approaches densely-populated areas, travels along a road, etc. Of course, any combination of light characteristics may be employed to highlight the presence of the user In one example, the wrist-wearable electronic device provides a strobe mode based on the user's cadence. The strobe mode can include flashing a red LED when the number of light emitting elements face backward as the user's arm wearing the wrist-wearable electronic device is swung backward and flashing white LEDs when the number of light emitting elements face forward when the user's arm wearing the wrist-wearable electronic device is swung forward. Such functionality, providing alternating colors corresponding to the user's stride, enables the user to be more visible to those nearby.

FIG. 1A is a perspective view of a wrist-wearable electronic device 100 including a number of light emitting elements 112-1, 112-2, and 112-3 in accordance with one or more embodiments of the present disclosure. The features described herein may be implemented on the wrist-wearable electronic device 100, in combination with an electronic device capable of accurately measuring position, in combination with an electronic device including a number of sensors, and/or in combination with an electronic device running an application. Wrist-wearable electronic device 100 is operable to provide fitness information and/or navigation functionality to the user of the wrist-wearable electronic device 100. The wrist-wearable electronic device 100 may be configured in a variety of ways. For instance, wrist-wearable electronic device 100 may be configured for use during fitness and/or sporting activities and comprise a cycle computer, a sport watch, a golf computer, fitness or sporting applications (e.g., apps), GNSS used for hiking, and so forth.

The wrist-wearable electronic device 100 includes a housing 102. The housing 102 is configured to house (e.g., substantially enclose) various components of the wrist-wearable electronic device 100. The housing 102 may be formed from a lightweight and/or impact-resistant material such as plastic, nylon, or combinations thereof. The housing 102 may be formed from a non-conductive material, such a non-metal material, for example. In some embodiments, the housing 102 may be formed from a conductive material, such as metal, or a semi-conductive material. The housing 102 may include one or more gaskets (e.g., a seal) to make the wrist-wearable electronic device 100 substantially waterproof or water resistant. A location for a battery and/or another power source for powering one or more components of the wrist-wearable electronic device 100 may be included in the housing 102. The housing 102 may be a singular piece or may include a plurality of sections.

The housing 102 can include a sidewall 132 that includes a first light emitting element 112-1, a second light emitting element 112-2, and/or a third light emitting element 112-3. The light emitting elements 112-1, 112-2, 112-3 can be individually or collectively referred to as light emitting elements 112. In some embodiments, the light emitting elements 112 can be on the sidewall 132, behind the sidewall 132, within the sidewall 132, or any combination thereof. The light emitting elements 112 can be LEDs, OLEDs, or any combination thereof.

The light emitting elements 112 can be located at a clock position between 10:00 and 2:00 to illuminate the ground around and in front of a user as the user walks and/or runs while limiting the amount of light that may shine into the user's eyes or the eyes of those nearby. Locating the light emitting elements 112 at the clock position between 10:00 and 2:00 also allows ambidextrous functionality so that the wrist-wearable electronic device 100 will be equally useful when the wrist-wearable electronic device 100 is worn on the right or left wrist of the user.

The wrist-wearable electronic device 100 includes a display 104. The display 104 may include a liquid crystal display (LCD), a thin film transistor (TFT), an LED, a light-emitting polymer (LEP), and/or a polymer light-emitting diode (PLED). However, embodiments are not so limited. The display 104 may be capable of displaying text and/or graphical information. The display 104 may be backlit via a backlight, for example, such that it may be viewed in the dark or other low-light environments. One example of the display 104 is a 100 pixel by 64 pixel film compensated super-twisted nematic display (FSTN) including a bright white LED backlight. However, embodiments are not so limited. The display 104 may include a transparent lens that covers and/or protects components of the wrist-wearable electronic device 100.

The display 104 may be provided with a touch screen to receive input (e.g., data, commands, etc.) from a user. For example, a user may operate the wrist-wearable electronic device 100 by touching the touch screen and/or by performing gestures on the display 104. In some embodiments, the display 104 may be a capacitive touch screen, a resistive touch screen, an infrared touch screen, or any combinations thereof.

The wrist-wearable electronic device 100 may also include a communication module representative of communication functionality to permit the wrist-wearable electronic device 100 to send/receive data between different devices (e.g., components/peripherals) and/or over one or more networks. The communication module may be representative of a variety of communication components and functionality including, but not limited to an antenna, a browser, a transmitter and/or receiver, a wireless radio, a data port, a software interface, a software driver, a networking interface, and/or a data processing component. The wrist-wearable electronic device 100 may be configured to communicate via one or more networks with a cellular provider and/or an Internet provider to receive mobile phone service and/or various content, respectively. Content may represent a variety of different content, examples of which include, but are not limited to map data including route information, web pages, services, music, photographs, video, email service, instant messaging, device drivers, real-time and/or historical weather data, instruction updates, and so forth.

The one or more networks are representative of a variety of different communication pathways and network connections which may be employed, individually or in combinations, to communicate among various components. Thus, the one or more networks may be representative of communication pathways achieved using a single network or multiple networks. Further, the one or more networks are representative of a variety of different types of networks and connections that are contemplated including, but not limited to, the Internet, an intranet, a satellite network, a cellular network, a mobile data network, wired and/or wireless connections, and so forth. Examples of wireless networks include, but are not limited to, networks configured for communications according to one or more standards of the Institute of Electrical and Electronics Engineers (IEEE), such as 802.11 or 802.16 (Wi-Max) standards, Wi-Fi standards promulgated by the Wi-Fi Alliance, Bluetooth standards promulgated by the Bluetooth Special Interest Group, and so on. Wired communications are also contemplated such as through universal serial bus (USB), Ethernet, serial connections, and so forth.

The wrist-wearable electronic device 100 may further include one or more input/output (I/O) devices (e.g., a keypad, buttons, a wireless input device, a thumbwheel input device, a trackstick input device, a microphone, a speaker, etc.). In accordance with one or more embodiments of the present disclosure, the wrist-wearable electronic device 100 can include a number of control buttons 106-1, 106-2, 106-3, and 106-4, which can be individually or collectively referred to as control buttons 106. As illustrated in FIG. 1A, the control buttons 106 can be associated with (e.g., adjacent) the housing 102. While FIG. 1A illustrates four control buttons 106 associated with the housing 102, embodiments are not so limited. For example, the wrist-wearable electronic device 100 may include fewer than four control buttons 106, such as one, two, or three control buttons 106. Additionally, the wrist-wearable electronic device 100 may include more than four control buttons 106, such as five, six, or seven, for example. The control buttons 106 are configured to control a number of functions of the wrist-wearable electronic device 100.

Figure 2:
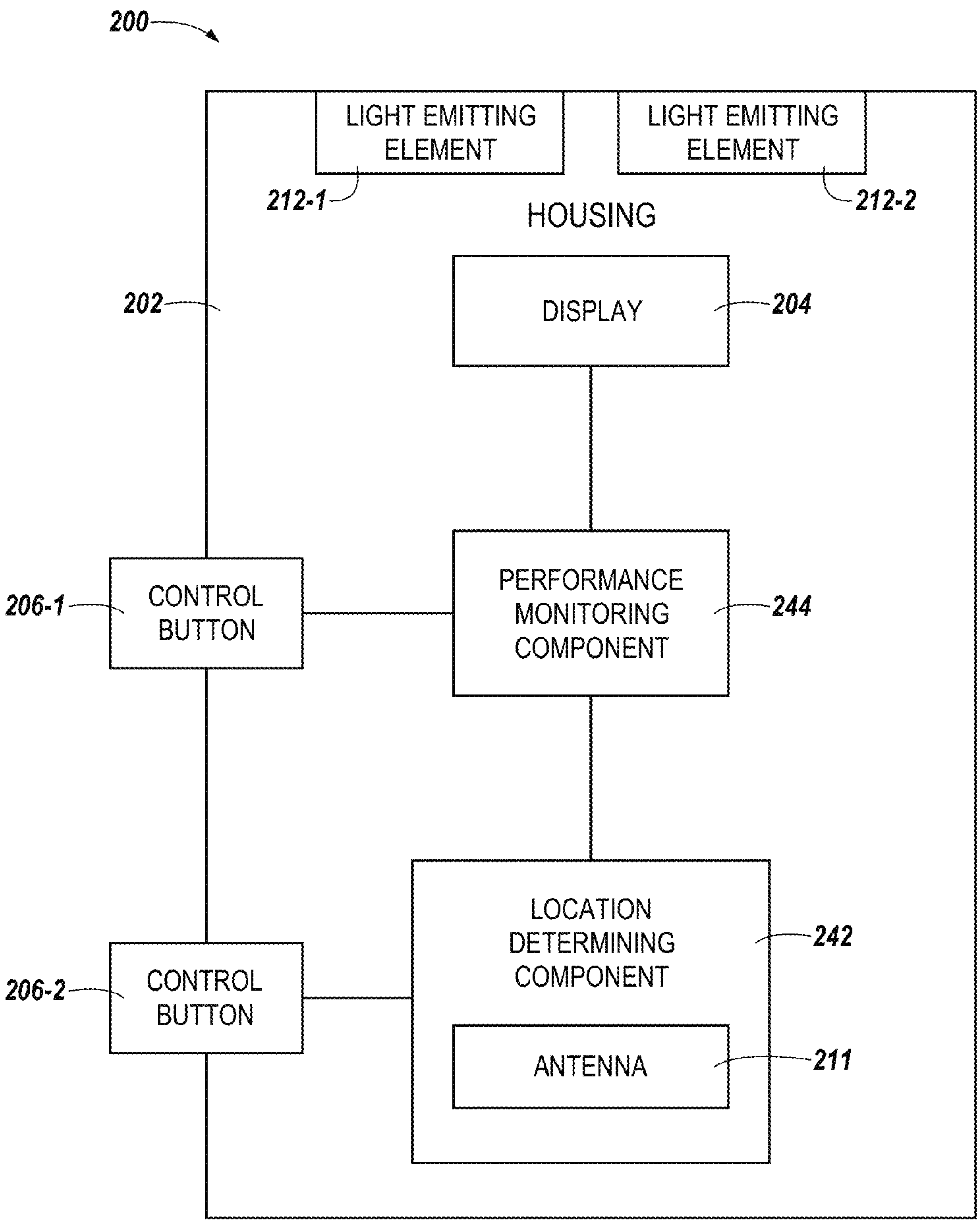
FIG. 2 is block hardware diagram of a wrist-wearable electronic device including a number of light emitting elements.

Functions of the wrist-wearable electronic device 100 may be associated with a location determining component (e.g., location determining component 242 in FIG. 2) and/or a performance monitoring component (e.g., performance monitoring component 244 in FIG. 2). Functions of the wrist-wearable electronic device 100 may include, but are not limited to, displaying a current geographic location of the wrist-wearable electronic device 100, mapping a location on the display 104, locating a desired location and displaying the desired location on the display 104, monitoring a user's heart rate, monitoring a user's speed, monitoring a distance traveled, calculating calories burned, and the like.

In some embodiments, user input may be provided from movement of the housing 102. For example, an accelerometer may be used to identify tap inputs on the housing 102 or upward and/or sideways movements of the housing 102. In some embodiments, user input may be provided from touch inputs identified using various touch sensing technologies, such as resistive touch or capacitive touch interfaces.

In accordance with one or more embodiments of the present disclosure, the wrist-wearable electronic device 100 can include a strap 108. As illustrated in FIG. 1A, the strap 108 is associated with (e.g., coupled to) the housing 102. For example, the strap 108 may be removably secured to the housing 102 via attachment of securing elements to corresponding connecting elements. Examples of securing elements and/or connecting elements include, but are not limited to hooks, latches, clamps, snaps, and the like. The strap 108 may be made of a lightweight and resilient thermoplastic elastomer and/or a fabric, for example, such that the strap 108 may encircle a portion of a user without discomfort while securing the housing 102 to the user. The strap 108 may be configured to attach to various portions of a user, such as a user's leg, waist, wrist, forearm, and/or upper arm.

Figure 1B:
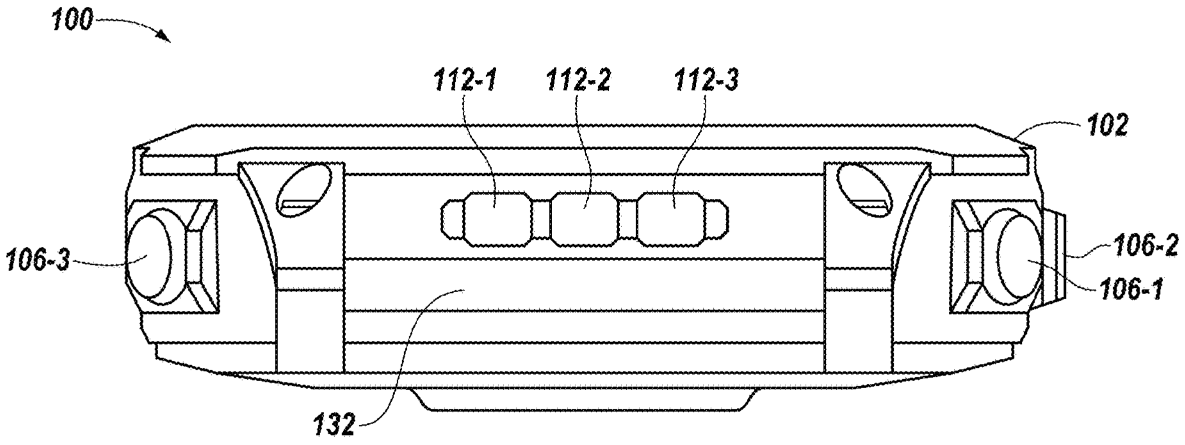
FIG. 1B is a side view of a wrist-wearable electronic device including a number of light emitting elements.

FIG. 1B is a side view of a wrist-wearable electronic device 100 including a number of light emitting elements 112-1, 112-2, and 112-3. The wrist-wearable electronic device 100 can include a housing 102 that includes one or more control buttons 106-1, 106-2, and 106-3, and a sidewall 132.

The wrist-wearable electronic device 100 can include a first light emitting element 112-1, a second light emitting element 112-2, and/or a third light emitting element 112-3 coupled to the housing 102. The light emitting elements 112-1, 112-2, and 112-3 can be individually or collectively referred to as light emitting elements 112. In a number of embodiments, the light emitting elements 112 can be on the sidewall 132 of the wrist-wearable electronic device 100, behind the sidewall 132 of the wrist-wearable electronic device 100, within the sidewall 132 of the wrist-wearable electronic device 100, or any combination thereof. When the light emitting elements 112 are coupled to the sidewall 132 of the wrist-wearable electronic device 100, less light from the lighting emitting elements 112 will go into the user's eyes when the user looks at a display (e.g., display 104 in FIG. 1A) of the wrist-wearable electronic device 100 because the light generated by the light emitting elements 112 is substantially perpendicular to the display. This allows the user to use the display even when the light emitting elements 112 are generating light.

The first light emitting element 112-1 can be at a first clock position, the second light emitting element 112-2 can be at a second clock position, and the third light emitting element 112-3 can be at a third clock position. The first clock position, the second clock position, and the third clock position can be between 10:00 and 2:00. In some embodiments, the second light emitting element 112-2 can be positioned between the first light emitting element 112-1 and the third light emitting element 112-3.

Figure 3:
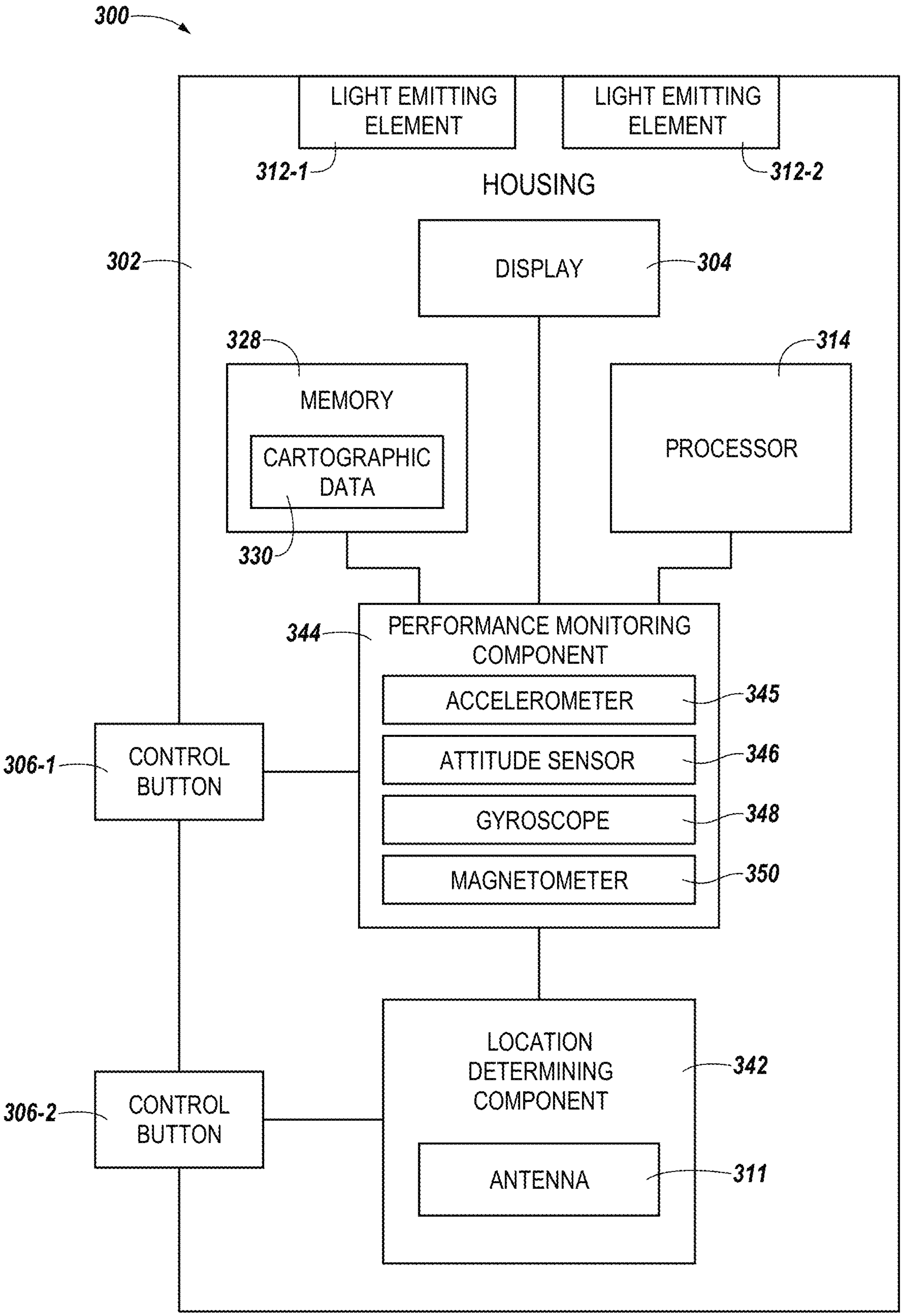
FIG. 3 is a block hardware diagram of a wrist-wearable electronic device including a number of light emitting elements.

The light emitting elements 112 can generate light for a period of time in response to receipt of a command from a processor (e.g., processor 314 in FIG. 3). For example, the third light emitting element 112-3 can be configured to generate a light for a period of time in response to receiving a command from the processor.

In some embodiments, the first light emitting element 112-1 is configured to generate a first color light, the second light emitting element 112-2 is configured to generate a second color light, and the third light emitting element 112-3 is configured to generate a third color light in response to receiving a command from the processor, a double tap on one or more control buttons 106, or in response to receiving a selection via a display (e.g., display 104 in FIG. 1A) including a touch-sensitive interface. The double tap can be a double tap of a single control button 106 or multiple control buttons 106. The first light, the second light, and/or the third light can each be the same color or different colors. For example, the first light generated by the first light emitting element 112-1 and the third light generated by the third light emitting element 112-3 can be white lights and the second light generated by the second light emitting element 112-2 can be a red light FIG. 2 is a block hardware diagram of a wrist-wearable electronic device 200 including a number of light emitting elements 212-1 and 212-2. The wrist-wearable electronic device 200 can correspond to the wrist-wearable electronic device 100 in FIGS. 1A and 1B and the light emitting elements 212-1 and 212-2 can correspond to light emitting elements 112 in FIGS. 1A and 1B. The wrist-wearable electronic device 200 can include a number of control buttons 206-1 and 206-2 corresponding to control buttons 106 in FIGS. 1A and 1B, a display 204 corresponding to display 104 in FIG. 1A, and housing 202 corresponding to housing 102 in FIGS. 1A and 1B. The wrist-wearable electronic device 200 can further include a location determining component 242 and a performance monitoring component 244.

In a number of embodiments, the location determining component 242 can be included in the housing 202 and can be coupled to the number of control buttons 206-1 and 206-2, the performance monitoring component 244, and/or the display 204. The location determining component 242 may include an antenna 211 having a ground plane. The ground plane may be formed by coupling a printed circuit board and/or a conductive cage with the antenna 211. The antenna 211 and the ground plane may be coupled using solder, connection elements, or combinations thereof. Location determining component 242 may include one or more antennas 211 to receive signal data as well as to perform other communications, such as communication via one or more networks.

The location determining component 242 may be a GNSS receiver that is configured to provide geographic location information to the wrist-wearable electronic device 200. The location determining component 242 may be, for example, a GNSS receiver such as those provided in various products by GARMIN®. Generally, GNSS is a satellite-based radio navigation system capable of determining continuous position, velocity, time, and direction information. Multiple users may simultaneously utilize GNSS. GNSS incorporates a plurality of GNSS satellites that orbit the earth. Based on these orbits, GNSS satellites can relay their location to a GNSS receiver. For example, upon receiving a GNSS signal (e.g., a radio signal) from a GNSS satellite, the wrist-wearable electronic device 200 disclosed herein can determine a location of that satellite. The wrist-wearable electronic device 200 can continue scanning for GNSS signals until it has acquired a number (e.g., at least three) of different GNSS satellite signals. The wrist-wearable electronic device 200 may employ geometrical triangulation, where the wrist-wearable electronic device 200 utilizes the known GNSS satellite positions to determine a position of the wrist-wearable electronic device 200 relative to the GNSS satellites. Accordingly, geographic location information and/or velocity information can be updated in real time on a continuous basis for the wrist-wearable electronic device 200.

The location determining component 242 may also be configured to provide a variety of other position-determining functionality. Location determining functionality, for purposes of discussion herein, may relate to a variety of different navigation techniques and other techniques that may be supported by a determination of one or more positions. For instance, location determining functionality may be employed to provide position/location information, timing information, speed information, and a variety of other navigation-related data. Accordingly, the location determining component 242 may be configured in a variety of ways to perform a wide variety of functions. For example, the location determining component 242 may be configured for outdoor navigation, vehicle navigation, aerial navigation (e.g., for airplanes and helicopters), marine navigation, personal use (e.g., as part of fitness-related equipment), and so forth. Accordingly, the location determining component 242 may include a variety of devices to determine position using one or more of the techniques previously described.

The location determining component 242, for instance, may use signal data received via a GNSS receiver in combination with map data that is stored in memory (e.g., memory 328 in FIG. 3) to generate navigation instructions (e.g., turn-by-turn instructions) to an input destination or point of interest (POI)), show a current position on a map, and so on. The location determining component 242 may also provide other positioning functionality, such as to determine an average speed and/or calculate an arrival time.

The location determining component 242 may include and/or be coupled to one or more processors (e.g., processor 314 in FIG. 3), controllers, and/or other computing devices as well as a memory for storing information accessed and/or generated by the processors or other computing devices. The processor may be electrically coupled with a printed circuit board and operable to process position determining signals received by the antenna 211. The antenna 211, is configured to receive and/or transmit position determining signals, such as GNSS signals from GNSS satellites, to determine a current geographic location of the wrist-wearable electronic device 200.

The memory may store cartographic data (e.g., cartographic data 330) and routing used by or generated by the location determining component 242. The memory is an example of device-readable storage media that provides storage functionality to store various data associated with the operation of the wrist-wearable electronic device 200, such as the software program and code segments mentioned above, or other data to instruct the processor and other elements of the wrist-wearable electronic device 200 to perform the techniques described herein.

Antenna 211 may be any antenna capable of receiving wireless signals from a remote source, including directional antennas and omnidirectional antennas. Antenna 211 may include any type of antenna in which the length of the ground plane affects the efficiency of the antenna. In accordance with one or more embodiments of the present disclosure, the antenna 211 is an omnidirectional antenna having a ground plane. An omnidirectional antenna may receive and/or transmit in both orthogonal polarizations, depending upon direction. In other words, omnidirectional antennas do not have a predominant direction of reception and/or transmission. Examples of omnidirectional antennas include, but are not limited to, inverted-F antennas (IFAs) and planar inverted-F antennas (PIFAs). In contrast to omnidirectional antennas, directional antennas have a primary lobe of reception and/or transmission over an approximate seventy (70) by 70 degree sector in a direction away from the ground plane. Examples of directional antennas include, but are not limited to, microstrip antennas and patch antennas.

In accordance with one or more embodiments of the present disclosure, the antenna 211 may be an embedded antenna. As used herein, an embedded antenna refers to an antenna that is positioned completely within a device housing. For example, antenna 211 may be positioned completely within housing 202. In some embodiments, antenna 211 may be an external antenna with all or a portion of the antenna 211 exposed from housing 202.

As discussed, the location determining component 242 can include or be coupled to the antenna 211. The antenna 211 may be associated with (e.g., formed on and/or within) an antenna support assembly. Antenna 211 may be positioned on a top portion or one or more side portions of the antenna support assembly. In some embodiments, the antenna support assembly and antenna 211 may be positioned in a center of a top surface, bottom surface, or to a side of the printed circuit board. The printed circuit board may support the bottom portion of the antenna support assembly.

The printed circuit board can be included in or coupled to the location determining component 242 and may support a number of processors, microprocessors, controllers, microcontrollers, programmable intelligent computers (PIC), field-programmable gate arrays (FPGA), other processing components, other field logic devices, application specific integrated circuits (ASIC), and/or a memory that is configured to access and/or store information that is received or generated by the wrist-wearable electronic device 200.

The performance monitoring component 244 may be positioned within the housing 202 and can be coupled to the number of control buttons 206-1 and 206-2, the location determining component 242, and/or the display 204. The performance monitoring component 244 may receive information including, but not limited to, geographic location information from the location determining component 242. The geographic location information can be used to perform a function, such as monitoring performance and/or calculating performance values and/or information related to the wrist-wearable electronic device 200 user's movement (e.g., exercise). The performance values may include, for example, a heart rate of the user, a speed of the user, a total distance traveled by the user, a total distance goal, a speed goal, a pace of the user, a cadence of the user, and/or calories burned by the user. These values and/or information may be presented on the display 204.

In some embodiments, the wrist-wearable electronic device 200 includes a user interface, which is storable in memory and executable by the processor. The user interface is representative of functionality to control the display of information and data to the user of the wrist-wearable electronic device 200 via the display 204. In some implementations, the display 204 may not be integrated into the wrist-wearable electronic device 200 and may instead be connected externally using universal serial bus (USB), Ethernet, serial connections, and so forth.

The user interface may provide functionality to allow the user to interact with one or more applications of the wrist-wearable electronic device 200 by providing inputs via a touch screen and/or 110 devices. For example, the user interface may cause an application programming interface (API) to be generated to expose functionality to an application to configure the application for display by the display 204 or in combination with another display. In embodiments, the API may further expose functionality to configure the application to allow the user to interact with an application by providing inputs via the touch screen and/or the I/O devices. Applications may comprise software, which is storable in memory and executable by the processor, to perform a specific operation or group of operations to furnish functionality to the wrist-wearable electronic device 200. Example applications may include a fitness application, an exercise application, a health application, a diet application, a cellular telephone application, an instant messaging application, an email application, a photograph sharing application, a calendar application, an address book application, and so forth.

In some embodiments, the user interface may include a browser. The browser enables the wrist-wearable electronic device 200 to display and interact with content such as a webpage within the World Wide Web, a webpage provided by a web server in a private network, and so forth. The browser may be configured in a variety of ways. For example, the browser may be configured as an application accessed by the user interface. The browser may be a web browser suitable for use by a full resource device with substantial memory and processor resources (e.g., a smart phone, a personal digital assistant (PDA), etc.). However, in one or more implementations, the browser may be a mobile browser suitable for use by a low-resource device with limited memory and/or processing resources (e.g., a mobile telephone, a portable music device, a transportable entertainment device, etc.). Such mobile browsers typically conserve memory and processor resources but may offer fewer browser functions than web browsers.

FIG. 3 is a block hardware diagram of a wrist-wearable electronic device 300 including a number of light emitting elements 312-1 and 312-2. The wrist-wearable electronic device 300 can correspond to the wrist-wearable electronic device 200 in FIG. 2 and the light emitting elements 312-1 and 312-2 can correspond to the light emitting elements 212-1 and 212-2 in FIG. 2. The wrist-wearable electronic device 300 can include a housing 302, a display 304, a number of control buttons 306-1 and 306-2, a location determining component 342, an antenna 311, and a performance monitoring component 344, which can correspond to the housing 202, the display 204, the number of control buttons 206-1 and 206-2, the location determining component 242, the antenna 211, and the performance monitoring component 244 in FIG. 2, respectively.

The wrist-wearable electronic device 300 can further include a processor 314 and a memory 328. The processor 314 may provide processing functionality for the wrist-wearable electronic device 300 and may include any number of processors, microcontrollers, or other processing systems, and resident or external memory 328 for storing data and other information accessed or generated by the wrist-wearable electronic device 300. The processor 314 may execute one or more software programs that implement the techniques and modules described herein. The processor 314 is not limited by the materials from which it is formed, or the processing mechanisms employed therein and, as such, may be implemented via semiconductor and/or transistors (e.g., electronic integrated circuits (ICs)), and so forth.

In some embodiments, the processor 314 can be configured to transmit a first command to the first light emitting element 312-1 and a second command to the second light emitting element 312-2 included in the housing 302. The first light emitting element 312-1 can be configured to receive the first command from the processor 314 and generate a first color light for a first period of time in response to receiving the first command from the processor 314. The second light emitting element 312-2 can be configured receive the second command from the processor 314 and generate a second color light for a second period of time in response to receiving the second command from the processor 314.

The performance monitoring component 344 can include an accelerometer 345, an attitude sensor 346, a gyroscope 348, and a magnetometer 350. The accelerometer 345 can be configured to generate acceleration data of the wrist-wearable electronic device 300, the attitude sensor 346 can be configured to generate attitude data of the wrist-wearable electronic device 300, the gyroscope 348 can be configured to measure an angular velocity of the wrist-wearable electronic device 300, and the magnetometer 350 can be configured to measure a strength of a magnetic field, a direction of the magnetic field, or a combination thereof. As shown in FIG. 3, the processor 314 can be coupled to the accelerometer 345, the attitude sensor 346, the gyroscope 348, and the magnetometer 350.

The memory 328 can be coupled to the processor 314. The memory 328 is an example of device-readable storage media that provides storage functionality to store various data associated with the operation of the wrist-wearable electronic device 300, such as the software program and code segments mentioned above, or other data to instruct the processor 314 and other elements of the wrist-wearable electronic device 300 to perform the techniques described herein. A wide variety of types and combinations of memory may be employed. The memory 328 may be integral with the processor, stand-alone memory, or a combination of both. The memory may include, for example, removable and non-removable memory elements such as RAM, ROM, Flash (e.g., SD Card, mini-SD card, micro-SD Card, Trans-Flash card), magnetic, optical, USB memory devices, and so forth.

The memory 328 can store cartographic data 330. The processor 314 can be configured to determine an intensity, a color, a strobe frequency, or any combination thereof of the first light emitting element 312-1, the second light emitting element 312-2, or any combination thereof based on the cartographic data 330.

Figure 4A:
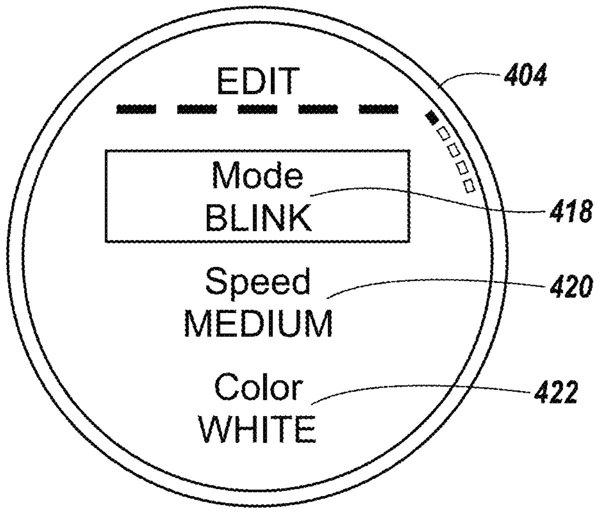
FIG. 4A illustrates an example of a user interface shown on a display of a wrist-wearable electronic device including characteristics of a light emitting element.

FIG. 4A illustrates an example of a user interface shown on a display 404 of a wrist-wearable electronic device (e.g., wrist-wearable electronic device 100 in FIGS. 1A and 1B) including characteristics of a light emitting element (e.g., light emitting element 112 in FIGS. 1A and 1B). The light emitting element can be the first light emitting element (e.g., first light emitting element 112-1 in FIGS. 1A and 1B), the second light emitting element (e.g., second light emitting element 112-2 in FIGS. 1A and 1B), the third light emitting element (e.g., third light emitting element 112-3 in FIGS. 1A and 1B), or a combination thereof.

The user interface can indicate a mode 418 of the light emitting element, a speed 420 of the light emitting element, and/or a color 422 of the light emitting element. The mode 418, speed 420, and/or color 422 of the light emitting element can be selected based on user interactions with a control button (e.g., control button 106 in FIGS. 1A and 1B) and/or user interactions with a touch-sensitive interface of the display 404. In some embodiments, a processor (e.g., processor 314 in FIG. 3) can be configured to receive a selection of the mode 418, the speed 420, and/or the color 422 and the processor can transmit a command to one or more of the number of light emitting elements to change the mode 418, the speed 420, and/or the color 422 of one or more of the number of light emitting elements.

The mode 418 of a light emitting element can include, but is not limited to, a blink. When the mode 418 of the light emitting element is set to blink, the light emitting element can be configured to repeat a cycle in which the light generated by the light emitting element is on for a period of time and off for a period of time.

In some embodiments, the periods of time can be determined by the speed 420. The speed 420 can be low, medium, and high, for example. In the embodiment shown in FIG. 4A, the speed 420 is set to medium. When the speed 420 is set to high, the period of time the light is on and the period of time the light is off can be less than when the speed 420 is set to medium and when the speed 420 is set to medium, the period of time the light is on and the period of time the light is off can be less than when the speed 420 is set to low.

In some embodiments, the mode 418 of the light emitting element may be a mode 418 in which the light emitting element remains on, generating light, and does not turn off until a subsequent user input instructs the light emitting element to turn off. In these embodiments, the option to select a speed 420 of the light may be unavailable since the light emitting element will remain on until an input from the user to turn off the light is received.

The light emitting element can be set to generate at least one of a variety of colors 422 of light. The user can select the color 422 of each of the first light emitting element, the second light emitting element, and/or the third light emitting element separately or simultaneously.

Figure 4B:
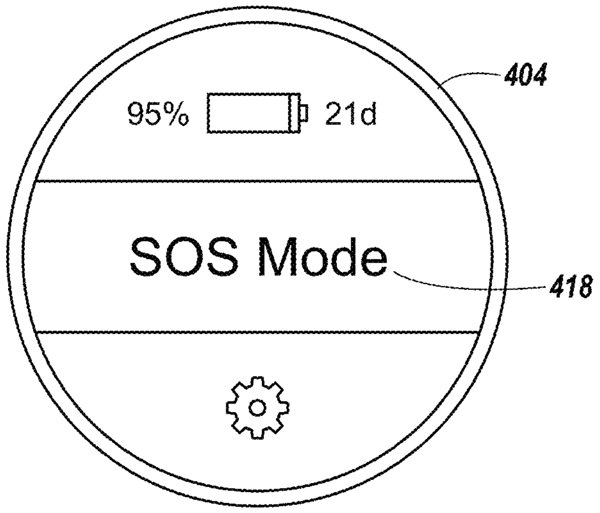
FIG. 4B illustrates an example of a user interface shown on a display of a wrist-wearable electronic device including characteristics of a light emitting element.

FIG. 4B illustrates an example of a user interface shown on a display 404 of a wrist-wearable electronic device (e.g., wrist-wearable electronic device 100 in FIGS. 1A and 1B) including characteristics of a light emitting element (e.g., light emitting element 112 in FIGS. 1A and 1B). The display 404 can allow a user to select a mode 418 of the light emitting element. The mode 418 of the light emitting element can be selected based on user interactions with a control button (e.g., control button 106 in FIGS. 1A and 1B) and/or user interactions with a touch-sensitive interface of the display 404.

As shown in FIG. 4B, the mode 418 of the light emitting element can include, but is not limited to, an SOS mode. In the SOS mode, the light emitting element can perform a light sequence where the light can be flashed on three times for one second each, then the light can be flashed on three times for two seconds each, and then repeated.

In some embodiments, the mode 418 of the light emitting element may be a mode 418 in which the light continues a light sequence and does not stop until a subsequent user input instructs the light emitting element to turn off and/or switch to a different mode 418.

Figure 5:
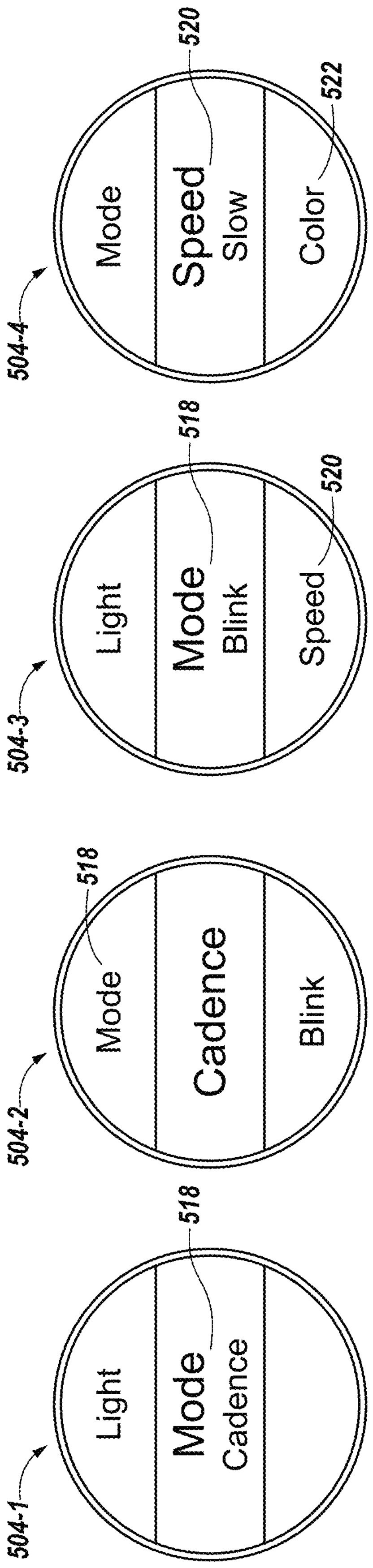
FIG. 5 illustrates an example of a user interface shown on a display of a wrist-wearable electronic device including characteristics of a light emitting element.

FIG. 5 illustrates an example of a user interface shown on a display 504 of a wrist-wearable electronic device (e.g., wrist-wearable electronic device 100 in FIGS. 1A and 1B) including characteristics of a light emitting element. FIG. 5 illustrates the selection of a mode 518 and speed 520 of a light emitting element (e.g., light emitting element 112 in FIGS. 1A and 1B). The display 504-1 shows a user interface including a menu for selecting a mode 518 of a light emitting element. The mode 518 can be selected by the user via interactions with control buttons (e.g., control buttons 106 in FIGS. 1A and 1B) and/or interactions with the display 504 when it is a touch-sensitive display.

The display 504-2 illustrates a user interface including a number of modes 518 presented in response to a user selection of the mode 518 from the user interface of display 504-1. The menu for the mode 518 shown on the display 504-2 allows a user to select one of the number of modes 518 for one or more of a number of light emitting elements. The mode 518 can be, but is not limited to, a cadence mode and a blink mode. As used herein, "cadence mode" refers to a mode of the wrist-wearable electronic device in which characteristics of a light emitted by a light emitting element of the wrist-wearable electronic device is determined by a cadence of the user. The cadence of the user can be a beat, time, or measure of rhythmical motion of the user.

The display 504-3 illustrates a user interface including a menu that shows a mode 518 and a speed 520 of the light emitting element. The display 504-3 shows that the mode 518 of the light emitting element has been set to blink in response to a user selecting blink on the user interface of display 504-2.

The display 504-4 illustrates a user interface including a speed 520 and a color 522 of the light emitting element in a menu. As shown on display 504-4, the speed 520 of the light emitting element can include, but is not limited to, a slow speed. The speed 520 and the color 522 of the light emitting element can be selected by a user via interactions with control buttons of the wrist-wearable electronic device and/or interactions with the display 504-4 when it is a touch-sensitive display.

Figure 6A:
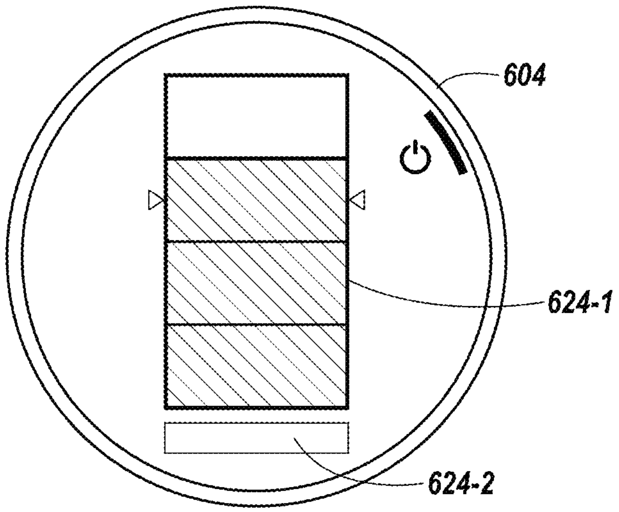
FIG. 6A illustrates an example of a user interface shown on a display of a wrist-wearable electronic device including characteristics of a light emitting element.

FIG. 6A illustrates an example of a user interface shown on a display 604 of a wrist-wearable electronic device (e.g., wrist-wearable electronic device 100 in FIGS. 1A and 1B). Display 604 can correspond to display 104 in FIGS. 1A and 1B. Display 604 shows the user interface including one or more indicators 624-1 and 624-2 that indicate characteristics of the one or more light emitting elements. The characteristics can include, but are not limited to, whether the light emitting element is generating light, the intensity of the light, and/or the color of the light. The display 604 can show a first indicator 624-1 representing one or more characteristics of a light of a first light emitting element and a second indicator 624-2 representing one or more characteristics of a light of a second light emitting element.

Four rectangles shown on the display 604 can represent the first indicator 624-1. The four rectangles (e.g., bars) can show whether the first light emitting element is turned on or turn off and the intensity of the first light emitting element. For example, three of the four rectangles that represent the first indicator 624-1 are lit up and/or filled in with a particular color, which is illustrated by linear hatching in FIG. 6A. This can indicate that the first light emitting element is turned on and is set to a higher intensity, but not to the highest intensity. For example, if all four rectangles were lit up, the light of the first light emitting element would be at its highest intensity (e.g., brightest). If none of the rectangles were lit up, the first light emitting element would not be generating light.

In some embodiments, the first indicator 624-1 can also indicate a color of the light generated by the first light emitting element. For example, the color used to light and/or fill in the rectangles that represent the first indicator 624-1 can correspond to the color of the light generated by the first light emitting element. The color of the light used to light the rectangles that represent the first indicator 624-1 can change when the color of the light generated by the first light emitting element changes.

The rectangle below the four rectangles that represent the first indicator 624-1 can represent the second indicator 624-2. Similar to the first indicator 624-1, the rectangle that represents the second indicator 624-2 can indicate characteristics of the light generated by the second light emitting element. The second indicator 624-2 in FIG. 6A can indicate that the second light emitting element is turned off since the second indicator 624-2 is not lit up.

Figure 6B:
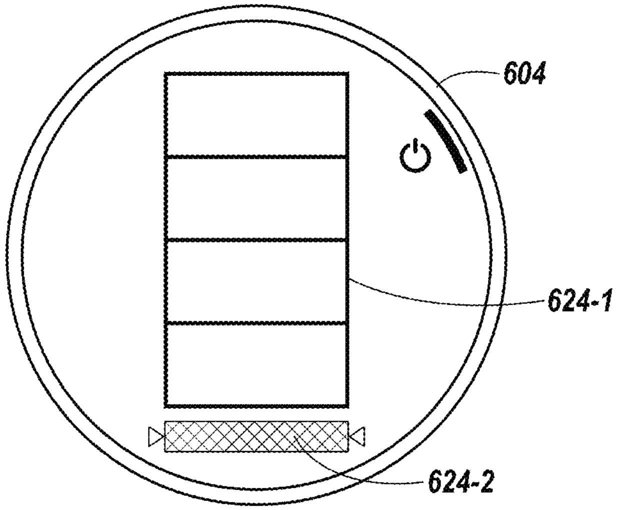
FIG. 6B illustrates an example of a user interface shown on a display of a wrist-wearable electronic device including characteristics of a light emitting element.

FIG. 6B illustrates an example of a user interface shown on a display 604 of a wrist-wearable electronic device (e.g., wrist-wearable electronic device 100 in FIGS. 1A and 1B). A first indicator 624-1 in FIG. 6B indicates that the first light emitting element is not generating light (e.g., turned off). This is indicated by none of the four rectangles that represent the first indicator 624-1 being lit up.

The second indicator 624-2 indicates that the second light emitting element is generating light (e.g., turned on). The color used to light the second indicator 624-2 can indicate the color of the second light emitting element. The color used to light the second indicator 624-2 can change when the light of the second light emitting element changes.

Figure 7:
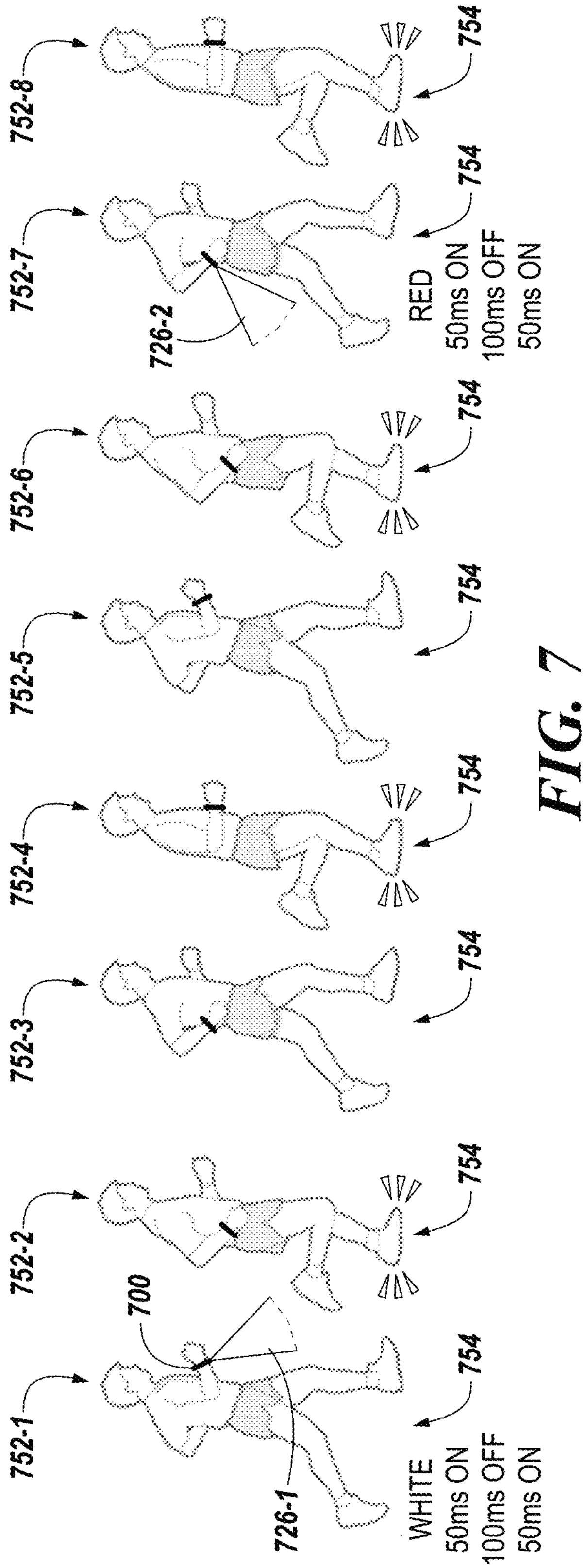
FIG. 7 illustrates an example of a user using a wrist-wearable electronic device including a light emitting element.

FIG. 7 illustrates an example of a user 754 using a wrist-wearable electronic device 700 including a number of light emitting elements (e.g., light emitting elements 112 in FIGS. 1A and 1B). FIG. 7 illustrates how light emitting elements of the wrist-wearable electronic device 700 can react to the movement of the user 754. The wrist-wearable electronic device 700 can include a performance monitoring component (e.g., performance monitoring component 344 in FIG. 3), a location determining component (e.g., location determining component 342 in FIG. 3), and/or a processor (e.g., processor 314 in FIG. 3).

In some embodiments, the position of the wrist-wearable electronic device 700 can be a position relative to the user 754. For example, the processor can be configured to determine when the wrist-wearable electronic device 700 reaches a position relative to the user 754 based on acceleration data, attitude data, angular velocity data, magnetic field data, or any combination thereof received from the performance monitoring component. In some embodiments, the position of the wrist-wearable electronic device 700 can correspond to the position of the user's 754 wrist on which the wrist-wearable electronic device 700 is affixed relative to the user's 754 torso.

The processor can be configured to transmit a first command to a first light emitting element in response to determining when the wrist-wearable device 700 reaches a specified forward position relative to the user 754. The specified forward position is represented by user positions 752-1 and 752-5. In some embodiments, a first light emitting element of the wrist-wearable electronic device 700 can be configured to generate a first light 726-1 when the arm of the user 754 is at the lowest position of the swing arc moving toward the specified forward position relative to the user 754 in response to receiving the first command. The swing arc of the user's 754 arm is a path of the user's 754 arm movement as it moves back and forth and/or side to side. As used herein, the term "arc" refers to movement in a curved path. User positions 752-4 and 752-8 can represent when the arm of the user 754 is at the lowest position of the swing arc moving toward the specified forward position relative to the user 754.

The processor can also be configured to transmit a second command to a second light emitting element in response to determining when the wrist-wearable electronic device 700 reaches a specified rearward position relative to the user 754. The specified rearward position is represented by user positions 752-3 and 752-7. In some embodiments, a second light emitting element of the wrist-wearable electronic device 700 can be configured to generate a second light 726-2 when the arm of the user 754 is at the lowest position of the swing arc moving toward the specified rearward position relative to the user 754 in response to receiving the second command. User positions 752-2 and 752-6 can represent when the arm of the user 754 is at the lowest position of the swing arc moving toward the specified rearward position relative to the user 754. In some examples, the processor can dynamically identify the swing arc to change a timing of the first and second commands.

In a number of embodiments, the processor can be configured to transmit the first command and a third command in response to determining the arm of the user 754 is at the lowest position of the swing arc moving toward the specified forward position relative to the user 754 and transmit the second command and a fourth command in response to determining the arm of the user 754 is at the lowest position of the swing arc moving toward the specified rearward position relative to the user 754. The first light emitting element can be configured to generate the first light 726-1 when the arm of the user 754 is at the lowest position of the swing arc moving toward the specified forward position relative to the user 754 in response to receiving the first command and turn off the first light 726-1 when the arm of the user 754 is at the lowest position of the swing arc moving toward the specified rearward position relative to the user 754 in response to receiving the fourth command. The second light emitting element can generate the second light 726-2 when the arm of the user 754 is at the lowest position of the swing arc moving toward the specified rearward position relative to the user in response to receiving the second command and turn off the second light 726-2 when the arm of the user 754 is at the lowest position of the swing arc moving toward the specified forward position relative to the user 754 in response to receiving the third command.

The processor can be configured to determine an intensity, a color, a strobe frequency, or any combination thereof of the first light emitting element, the second light emitting element, or any combination thereof based on a speed, an arm cadence, stride cadence, foot strike, and/or arm swing arc of the user 754. The arm cadence of a user 754 is the pace of the movement of the user's 754 arm and the stride cadence of the user 754 is the pace of the movement of the user's 754 legs. The foot strike of the user 754 is the approximate moment when the user's 754 foot touches the ground. The processor can be configured to determine the speed, arm cadence, stride cadence, foot strike, and/or swing arc of the user 754 based on the acceleration data, the attitude data, and/or the angular velocity data of the wrist-wearable electronic device 700.

The processor can be configured to transmit a command to the first light emitting element, the second light emitting element, or any combination thereof in response to determining the foot strike of the user 754. In some embodiments, the processor can be configured to transmit the command to change at least one light characteristic including an intensity, a color, and/or a strobe frequency of the first light emitting element and/or the second light emitting element based on the cartographic data and/or the speed of the user 754. The first light emitting element, the second light emitting element, or any combination thereof can be configured to receive the command command and change the color of the first and/or second light emitting elements in response to receiving the command.

In some embodiments, a color of the first light 726-1 can be different than a color of the second light 726-2. For example, the first light 726-1 can be white and the second light 726-2 can be red. One light emitting element can generate the first light 726-1 and the second light 726-2 or a first light emitting element can generate the first light 726-1 and a second light emitting element can generate the second light 726-2. In some examples, first and second light emitting elements can generate the first light 726-1 and a third light emitting element can generate the second light 726-2.

In the embodiment shown in FIG. 7, the light emitting element emits a first light 726-1 at user position 752-1. The first light 726-1 can be a white light in a blink mode. The particular amount of time in which the first light 726-1 is turned on while the first light 726-1 is in a blink mode can be 50 milliseconds (ms) and the particular amount of time in which the first light 726-1 is turned off while the first light 726-1 is in blink mode can be 100 ms. The same or different light emitting element can emit a second light 726-2 at user position 752-7. The second light 726-2 can be a red light in blink mode. The particular amount of time in which the second light 726-2 is turned on can be 50 ms and the particular amount of time in which the second light 726-2 is turned off can be 100 ms.

The location determining component can be a GNSS receiver configured to determine a continuous position of the wrist-wearable electronic device 700, a velocity of the wrist-wearable electronic device 700, a time of the wrist-wearable electronic device 700, the direction of the wrist-wearable electronic device 700, or any combination thereof. The processor can be coupled to the GNSS receiver and configured to determine characteristics of the first light 726-1 and/or the second light 726-2 based on the continuous position of the wrist-wearable electronic device 700, the velocity of the wrist-wearable electronic device 700, the time of the wrist-wearable electronic device 700, the direction of the wrist-wearable electronic device 700, or a combination thereof. The processor can transmit a command and a light emitting element can receive the command and generate a characteristic of the first light 726-1 and/or the second light 726-2 in response to receiving the command.

The processor can further be configured to determine a population density, a current position relative to a road, or any combination thereof based on the continuous position of the wrist-wearable electronic device 700, the velocity of the wrist-wearable electronic device 700, the time of the wrist-wearable electronic device 700, the direction of the wrist-wearable device 700, data from a GNSS receiver, or a combination thereof. In some examples, the processor can transmit a different command in response to determining the population density, the current position relative to the road, or any combination thereof. The light emitting element can be configured to change characteristics of the first light 726-1 and/or the second light 726-2 in response to receiving the different command.

As used herein, the term "population density" refers to a population per unit area. Hence, the population density can refer to the number of people within a certain distance of the user. Therefore, the processor can send a command to the light emitting element to emit the first light 726-1 and/or the second light 726-2 with characteristics based on the population density of the user's location. For example, the processor can send a command that instructs the light emitting element to generate the first light 726-1 and/or the second light 726-2 at a greater intensity in a densely populated area and generate the first light 726-1 and/or the second light 726-2 at a lesser intensity in rural areas. The mode of the first light 726-1 and/or the second light 726-2 can also be based on the population density at the location of the user.

Characteristics of the first light 726-1 and/or the second light 726-2 emitted by the light emitting element can be based on a position of the user 754 relative to a road. The position of the user 754 relative to a road can be determined based on GNSS data received by the wrist-wearable electronic device 700. In some embodiments, characteristics of the first light 726-1 and/or the second light 726-2, such as an intensity and/or a mode, can change based on the position of the user 754 relative to the road. For example, the intensity of the first light 726-1 and/or the second light 726-2 can increase as the user 754 moves closer to a road and the intensity of the first light 726-1 and/or the second light 726-2 can decrease as the user 754 moves farther away from that road. Further, the mode of the first light 726-1 and/or the second light 726-2 can be a certain mode when the user 754 is within a certain distance of a road and a different mode when the user 754 is at least a certain distance away from that road.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A wrist-wearable electronic device comprising:

a housing including a face and a sidewall;

a display supported by the face of the housing and configured to present a color indicator for selection by the user;

a first light emitting element and a second light emitting element, the light emitting elements positioned in the sidewall of the housing between a 10:00 and a 2:00 position on the housing; and a processor enclosed within the housing, where the processor is operable to:

selectively illuminate the first light emitting element and the second light emitting element based on a user input provided by a user, and control at least one of the light emitting elements to produce a color corresponding to the selected indicator.

2. The device of claim 1, wherein the light emitting elements are positioned in the sidewall of the housing at approximately a 12:00 position.

3. The device of claim 1, wherein the first light emitting element illuminates a first color and the second light emitting element illuminates a second color.

4. The device of claim 1, wherein the display includes a touch screen configured to receive the user input from the user.

5. The device of claim 1, further including a control button associated with the housing, wherein the control button is configured to receive the user input from the user.

6. The device of claim 1, wherein the display is configured to indicate an intensity of the light emitted by at least one of the light emitting elements.

7. The device of claim 1, wherein the display includes a touch screen and the display is configured to present a plurality of intensity indicators for selection by the user, wherein the processor is configured to control the intensity of at least one of the light emitting elements based on the intensity indicator selected by the user.

8. The device of claim 1, further including a third light emitting element positioned in the sidewall of the housing between a 10:00 and a 2:00 position on the housing.

9. A wrist-wearable electronic device comprising:

a housing including a face and a sidewall;

a display supported by the face of the housing, the display including a touch screen operable to receive a user input from a user and configured to present a color indicator for selection by the user;

a first light emitting element and a second light emitting element, the light emitting elements positioned in the sidewall of the housing between a 10:00 and a 2:00 position on the housing; and a processor enclosed within the housing, where the processor is operable to:

selectively control an intensity level of at least one of the first and second light emitting elements based on the touch input provided by the user, and control at least one of the light emitting elements to produce a color corresponding to the selected color indicator.

10. The device of claim 9, wherein the light emitting elements are positioned in the sidewall of the housing at approximately a 12:00 position.

11. The device of claim 9, wherein the first light emitting element illuminates a first color and the second light emitting element illuminates a second color.

12. The device of claim 9, wherein the display is configured to indicate an intensity of the light emitted by at least one of the light emitting elements.

13. The device of claim 9, wherein the display is configured to present a plurality of intensity indicators for selection by the user, wherein the processor is configured to control the intensity of at least one of the light emitting elements based on the intensity indicator selected by the user.

14. A wrist-wearable electronic device comprising:

a housing including a face and a sidewall;

a display supported by the face of the housing, the display including a touch screen and configured to present a plurality of intensity indicators for selection by the user;

a first light emitting element and a second light emitting element, the light emitting elements positioned in the sidewall of the housing between a 10:00 and a 2:00 position on the housing; and a processor enclosed within the housing, where the processor is operable to:

selectively illuminate the first light emitting element and the second light emitting element based on a user input provided by a user, and control the intensity of at least one of the light emitting elements based on the intensity indicator selected by the user.

15. The device of claim 14, wherein the light emitting elements are positioned in the sidewall of the housing at approximately a 12:00 position.

16. The device of claim 14, wherein the first light emitting element illuminates a first color and the second light emitting element illuminates a second color.

17. The device of claim 14, wherein the display includes a touch screen configured to receive the user input from the user.

18. The device of claim 14, further including a control button associated with the housing, wherein the control button is configured to receive the user input from the user.

19. The device of claim 14, wherein the display is configured to indicate an intensity of the light emitted by at least one of the light emitting elements.

20. The device of claim 14, wherein the display is further configured to present a color indicator for selection by the user, wherein the processor is configured to control at least one of the light emitting elements to produce a color corresponding to the selected indicator.

21. The device of claim 14, further including a third light emitting element positioned in the sidewall of the housing between a 10:00 and a 2:00 position on the housing.

* * * * *